UNITED STATES PATENT OFFICE.

WILLIAM T. SHERWOOD, OF RIPON, WISCONSIN.

IMPROVEMENT IN MEDICAL COMPOUNDS OR BITTERS.

Specification forming part of Letters Patent No. 113,938, dated April 18, 1871.

*To all whom it may concern:*

Be it known that I, WILLIAM T. SHERWOOD, of the city of Ripon, in the county of Fond du Lac and State of Wisconsin, have invented a new and useful Compound which I denominate "Tonic Elixir Bitters or Elixir Gentian Compound;" and I do hereby declare the following to be a full, clear, and exact description thereof, which will enable others skilled in the art to make and use the same.

My invention consists in the mixture of the ingredients hereinafter mentioned, and making an elixir therefrom either by maceration, percolation, or displacement, after the usual manner of preparing tinctures.

I take of cortex cinnamomi, (cinnamon bark,) one ounce; cortex aurantii, (orange peel,) four ounces; cortex chinconæ, (Peruvian bark,) eight ounces; radix glycyrrhizæ, (licorice root,) one ounce; radix gentainæ, (gentian root,) one ounce; fructus vanillæ, (vanilla bean,) two drams; semen anise, (anise seed,) half an ounce; semen caruri, (caraway seed,) one ounce; semen cardamomi, (cardamom seed,) four ounces; semen coriandrum, (coriander seed,) half an ounce; syrupus simplex, (simple sirup,) six pints; aqua pura, (pure water,) eight pints; spiritus frumenti, (whisky,) thirty pints. I then grind or pulverize the gentian, cinchona, cinnamon, orange peel, licorice, vanilla, cardamom, caraway, coriander, and anise seed, add the whisky, and make a tincture therefrom by maceration, percolation, or displacement. I then add the sirup and water, and the elixir or compound is ready for use.

If desired, the dry ingredients above mentioned may first be made into fluid extracts after the usual manner of preparing such extracts, an ounce of the fluid extracts as usually prepared being equal in strength to an ounce of the dry or crude drug. When such extracts are used, take the same quantity thereof as of the crude articles mentioned in the formula, mix them with the whisky, sirup, and water, shake them well together, and filter the mixture, if necessary.

The compound thus prepared, when taken in doses of from a dessert-spoonful to a wine-glassful acts as an invigorating tonic, stimulant, and appetizer, assisting digestion, and imparting strength and tone to the stomach and digestive organs.

It is highly beneficial in dyspepsia, indigestion, general or nervous debility, and all cases where an aromatic invigorating tonic is required.

The licorice, vanilla, and other aromatics give the elixir a most agreeable flavor, rendering it acceptable to and readily retained upon the stomach, often allaying pain and irritation of that organ when it is in an irritable and disordered condition.

Having thus stated the nature and object of my invention, what I claim as new, and desire to secure by Letters Patent, is—

The manufacture or preparation of a compound which I denominate "tonic elixir bitters or elixir gentian compound" of the ingredients, in the proportion, and for the purpose specified.

WILLIAM T. SHERWOOD.

Witnesses:
F. P. GRANT,
J. J. SMITH.